(12) United States Patent
Pham et al.

(10) Patent No.: US 12,328,370 B2
(45) Date of Patent: Jun. 10, 2025

(54) METHOD OF FINDING SERVICE ENDPOINTS THAT CAN BE CUSTOMIZED

(71) Applicant: VIETTEL GROUP, Ha Noi (VN)

(72) Inventors: Thanh Tu Pham, Hung Yen Province (VN); Khac Thuan Lang, Ha Noi (VN); Van Tuan Nguyen, Hanoi (VN); Ngoc Lam Dao, Phu Tho Province (VN)

(73) Assignee: VIETTEL GROUP, Ha Noi (VN)

( * ) Notice: Subject to any disclaimer, the term of this patent is extended or adjusted under 35 U.S.C. 154(b) by 183 days.

(21) Appl. No.: 18/347,417

(22) Filed: Jul. 5, 2023

(65) Prior Publication Data
US 2024/0040007 A1   Feb. 1, 2024

(30) Foreign Application Priority Data

Jul. 29, 2022  (VN) ............................... 1-2022-04832

(51) Int. Cl.
*H04L 67/51* (2022.01)

(52) U.S. Cl.
CPC .................................. *H04L 67/51* (2022.05)

(58) Field of Classification Search
CPC .............................. H04L 67/51; G06F 9/5072
See application file for complete search history.

(56) References Cited

U.S. PATENT DOCUMENTS

| 11,528,212 | B1* | 12/2022 | Allie ........................ H04L 67/51 |
| 2023/0104568 | A1* | 4/2023 | Miriyala .................. H04L 45/42 |
| | | | 718/104 |
| 2023/0300030 | A1* | 9/2023 | Chen .................... H04L 41/0893 |
| | | | 709/223 |
| 2023/0362236 | A1* | 11/2023 | Nair ..................... H04L 67/1001 |
| 2024/0031337 | A1* | 1/2024 | Sharma ................. H04L 67/289 |

* cited by examiner

*Primary Examiner* — Glenton B Burgess
*Assistant Examiner* — Ranjan Pant
(74) *Attorney, Agent, or Firm* — patenttm.us

(57) ABSTRACT

The present invention provides a method of finding service endpoints that can be customized. The method includes the following steps: step 1: discover the "services" customized by the CSDE method, called the "services" CSDE; step 2: discover groups of running Pods belonging to the respective CSDE "services"; step 3: register the IP of the Pod to the corresponding CSDE "service" according to the requirement to use a specific network range. The method is deployed to the corresponding CSDE application for installation in a container virtualization environment.

1 Claim, 5 Drawing Sheets

METHOD OF FINDING SERVICE ENDPOINTS THAT CAN BE CUSTOMIZED

TECHNICAL FIELD COVERED

The present invention provides a method to support the creation of multiple "service" objects that enable an application running in a "group of containers" to use multiple network ranges in a container virtualization system simultaneously. The method proposed in the present invention is used in networking technology that connects applications running on the virtualization platform of containers and is called the Customs Service Discovery Endpoint (CSDE).

TECHNICAL STATUS OF THE INVENTION

The distribution and management system for virtualized resources of containers (referred to as K8s) is an open-source platform used to build virtualized systems and provide system resource management tools such as processors, temporary storage, network connection, and hard drive storage. In which, network resources are provided open according to the CNI (container network interface) standard of CNCF (cloud native computing foundation), called "additional network". When implementing system virtualization of containers it is necessary to specify a default "additional network" first.

In the container virtualization system, applications are provided with the following resources:

- Central Processing Unit (CPU): shared from the physical server where it resides.
- Random Access Memory (RAM): shared from the physical server where it resides.
- Hard disk: provided by the shared storage system.
- Network connection (Network): provided by "additional networks" that follow a common standard for packet exchange between physical and virtual environments.
- Namespace: In the K8s environment, resources are divided and isolated according to a mechanism before being allocated to the application, helping to avoid resource conflicts between unrelated applications. These isolated regions are called namespaces.

Applications running in the management units of the container virtualization system (Pod) will be provided with the virtualized resources mentioned above. Grouping of containers is a non-persistent object in the K8s approach; these groups can be recreated each time the application fails, or during an application upgrade; then another object of the group is created with the newly allocated resource, which includes a network resource such as an internet protocol (IP) address. Applications that connect to the Pod (directly by their IP) run the risk of losing connection when the Pod containing the application is recreated (either due to an application failure resulting in the Pod being recreated, or the lack of resources on the server the Pod is running on causes them to be recreated on a different server). To get around that, the container virtualization system creates a "service" object that can store and update the IP address changes of the buckets containing the containers that run a particular application. Then we use the "service" object as an always-available access point, which will always return information about which groups of applications are available to connect to; applications will be guaranteed to work behind these "services". However, in the K8s approach, the default "service" object always updates the IP of the first deployed "additional network", resulting in containers using multiple network bands for specialized connections different cannot be used (the connection loss problem mentioned above). This is the problem that this method needs to solve. This method will create "service" objects using IP ranges that are not the first network range added.

This method still creates "services" according to the K8s approach, which helps to ensure the inherent integrity of the "service" object, so that the "service" object can be used correctly for original design purposes. This is a highlight of this method.

TECHNICAL NATURE OF THE INVENTION

The purpose of the present invention is to propose a method for creating K8s "services" using IP ranges other than those supported by the default IP range of the K8s. This method makes it possible for an application to use multiple IP networks ranges simultaneously for different application-specific purposes and allows application developers to freely choose the use of network bands (according to the capabilities of the application network type provided), for the appropriate purposes of the application.

To achieve the foregoing, the present invention provides a method CSDE which is responsible for registering an optional IP range for the K8s "service" by employing the following steps:

Step 1: discover the "services" customized by the CSDE method, called "services" CSDE; At this step, create K8s "services" with names marked to identify "services" using the CSDE method for registering Pod optional IPs. After creating these "services", a CSDE-deployed application (hereinafter collectively referred to as CSDE) will read the existing "services" in the environment, looking for CSDE "services" and stores a list of those "services," along with the namespace under which the "service" is deployed.

Step 2: discover the groups of running containers belonging to the respective CSDE "services". At this step, create Pods with labels marking the use of optional IPs. The CSDE application will then find groups with this label to compare with the list of "services" available after running step 1. The details of the label information and how to handle the specific information are as follows:

- Name of the namespace: this is where the "service" object is created. The CSDE application uses this information, to scan for namespace "services" from the list obtained after step 1.
- Service name: used to match the "service" name in the list that was available after step 1.
- Network interface name: this interface already exists in the Pod and the interface information here is used by CSDE to get the desired IP of the group.

Step 3: register the IP of the Pod to the corresponding CSDE "service" according to the requirement to use a specific network range; At this step, after getting the list of groups corresponding to the desired "service", proceed to register the IP address of the network range that the group wants to use into the corresponding "service" found in step 2.

DETAILED DESCRIPTION OF THE INVENTION

The "find customizable service endpoints" method presented helps to create "services" with arbitrary IP lists according to the application developer's desire to use different network ranges across the network. K8s environment. This approach is deployed as a deployment service in the K8s environment, called CSDE.

In this patent, the technical terms are construed as follows:
Namespace: in the K8s environment, resources are divided and isolated according to a mechanism before allocating to the application, helping to avoid resource conflicts between unrelated applications. These isolated regions are called namespaces.
Label: is an array of variables with a data dictionary structure used to mark one or more objects for the purpose of managing a group of objects with the same management level.
Container: is a K8s object virtual concept, used to emulate a "logic server" that can run various virtualized applications and tightly linked objects. Is the smallest management unit of K8s.
Network interface: Pod is roughly understood as a "logical server" to run applications, in this server there will be network interfaces to communicate and share information between servers (all physical and container virtualization environments).
"Services": is a way to expose an application running in Pods as a network service.

Specifically, the method of finding service endpoints that might customize the proposal includes the steps detailed below:

Step 1: discover the "services" customized by the CSDE method, called the "services" CSDE.

Figure 1:
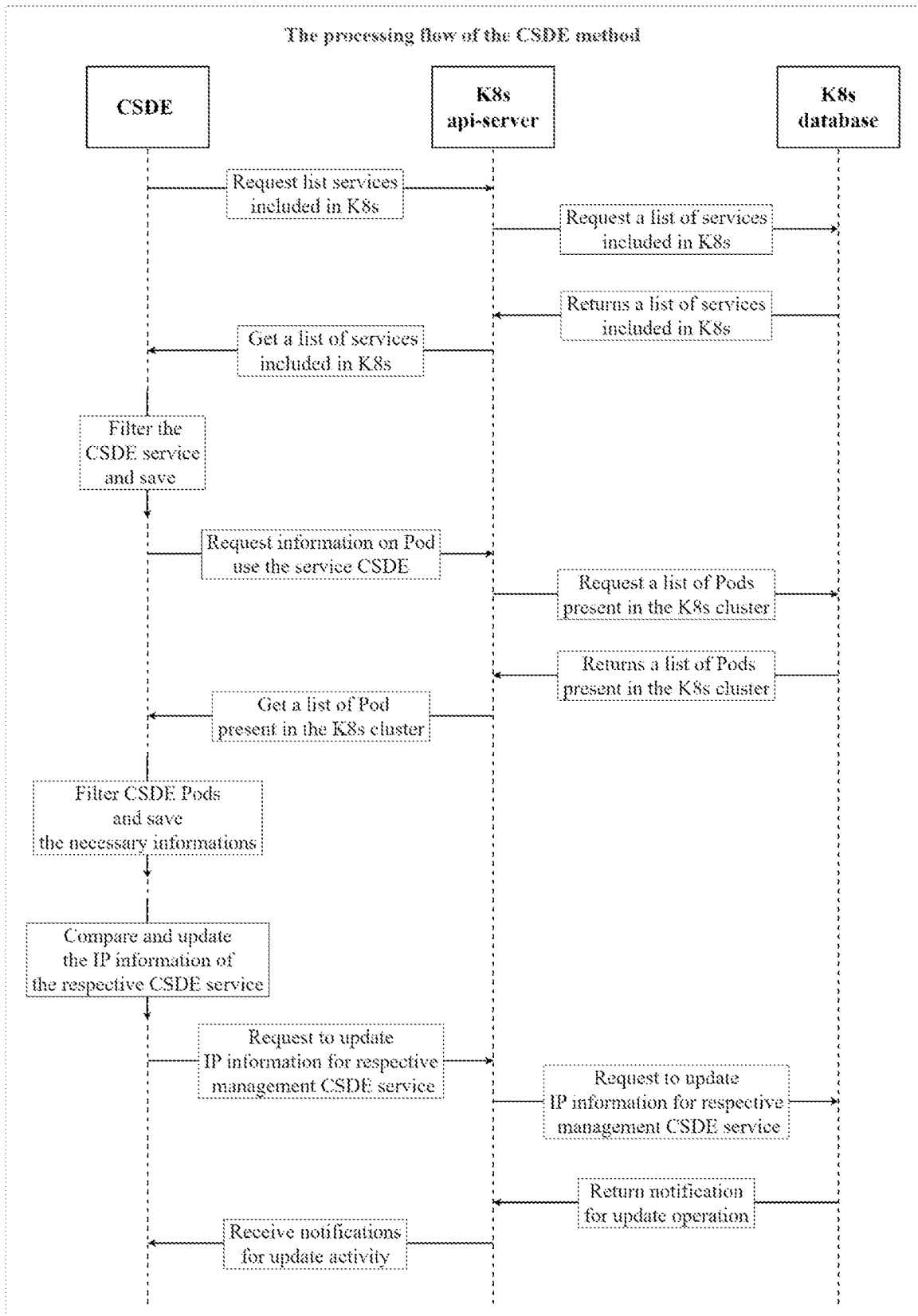
FIG. 1: is a drawing depicting the processing flow of the CSDE method.

FIG. 1 shows how to filter the CSDE "service" information from the virtualized environment.

At this step, the CSDE application collects information about the "services" that exist in the environment (stored in the K8s database) by sending HTTP protocol queries to the K8s gateway component. These custom "services" are named with the prefix "csde-" preceded by the official name of the "service". After obtaining information about all "services" on all existing namespaces in the environment, the application identifies the CSDE "services" by prefixing the "csde-" prefix to the "service" name, then injects the CSDE "services" and their namespaces into the data structure to track changes to the enclosing Pod.

The data structure that stores the "service" is a list variable of the application consisting of the following elements:

| Attributive | Type | Mean |
| --- | --- | --- |
| Namespace | String | The name of the namespace in which the custom "service" is created. |
| Service | String | The name "service" that is identified as using the CSDE method. |
| Port | Object | Contains a list of ports (application port, service port, or server port) declared for use in the service. |

Figure 2:
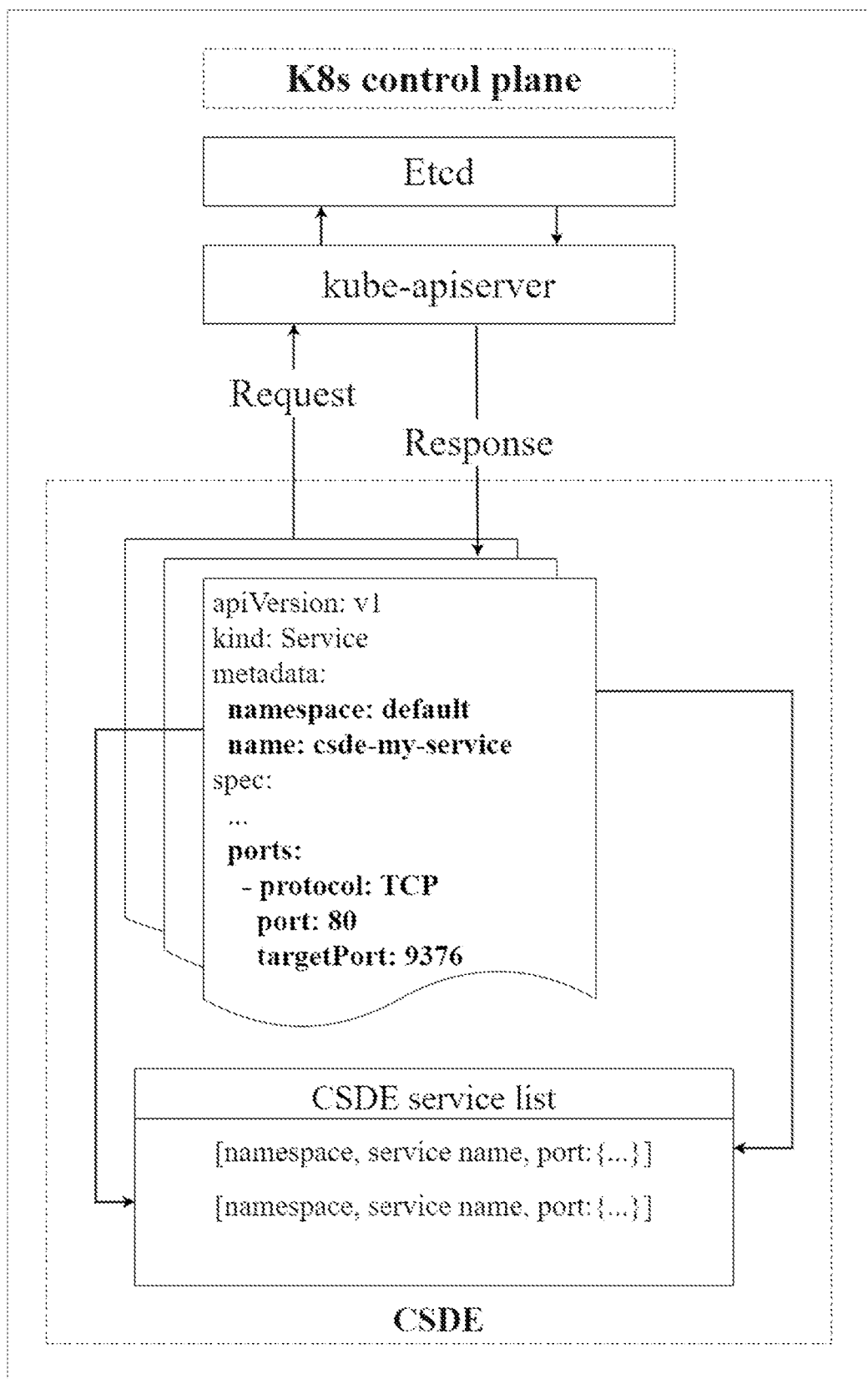
FIG. 2: is a drawing depicting the process of handling the CSDE "service" object.

FIG. 2 depicts the variable that stores a "service" object in the application.

Step 2: discover the groups of running containers belonging to the respective CSDE "services".

The next task is to find all running Pods that are "associated" with the respective "services" in use. A group can belong to many different CSDE "services" corresponding to each network interface that the developer wants to use specifically, for example, using an interface to contact the same type of application (forming the application cluster to ensure the readiness of the application) and another network interface so that the application can connect to the application's database. Correspondingly, the group will belong to two "services" that serve two different purposes.

To find out what "service" the group intends to use and the corresponding network interface, we examine the labels contained in the group to find information. These labels are a pre-conventional "key: value" pair that helps detect pods that use a particular CSDE "service". This value pair is stored as a JSON data structure in the K8s cluster's own database.

The groups will be labeled with labels indicating which CSDE "service" they want to use, which has the form csde*: <namespace>_<service>_<interface_pod>. Details of the label information are described in the table below:

| Element | Mean |
| --- | --- |
| <Namespace> | The namespace that the "service" creates in it. |
| <Service> | Name "service" that uses the CSDE method. |
| <Interface pod> | The network interface name of the Pod that wants to update the IP address to the service's management list. |

Figure 3:
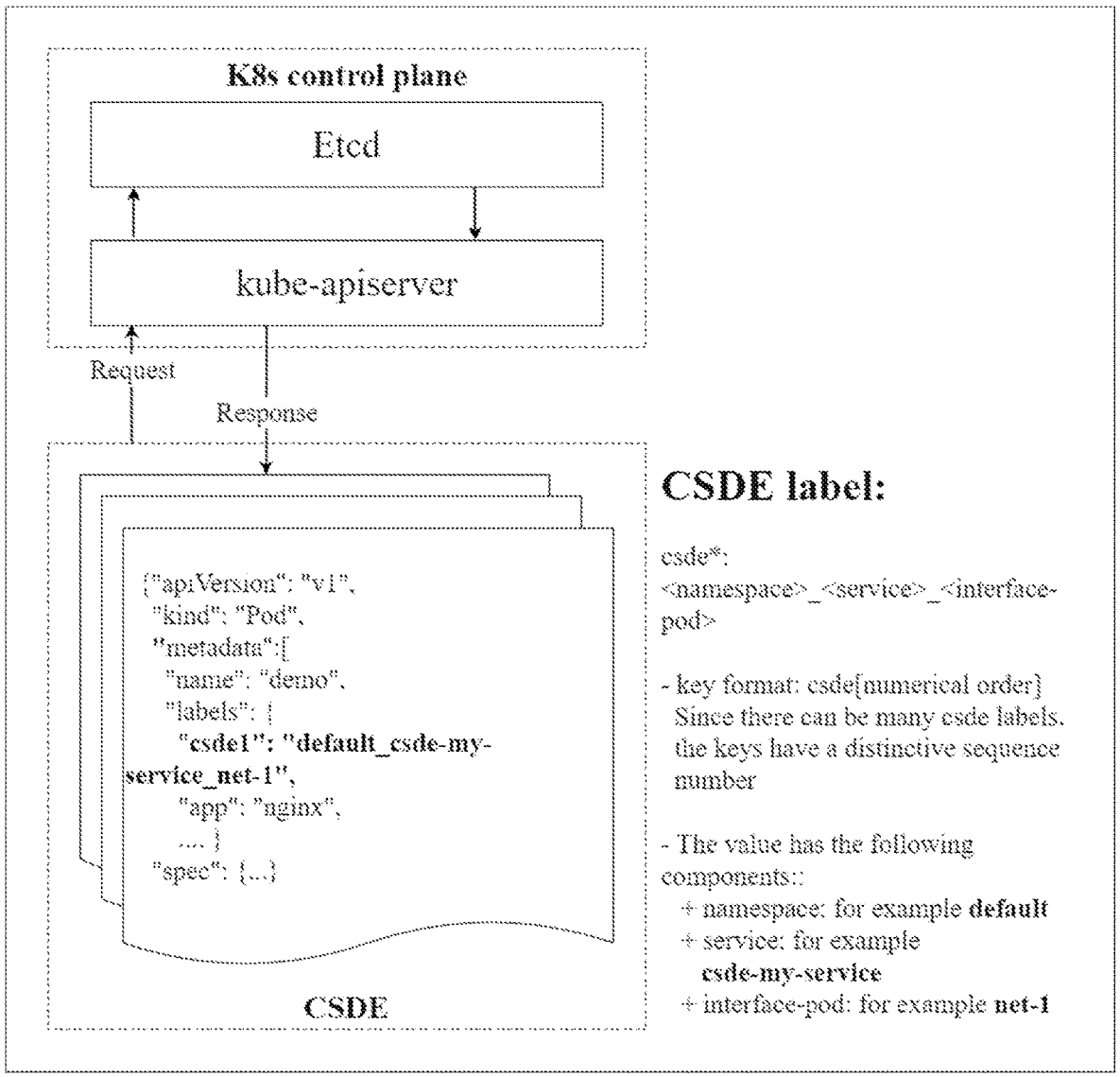
FIG. 3: is a drawing depicting the label assignment of Pods.

FIG. 3 depicts the position of the label in the Pod object.

Once it is known which CSDE Pod wants to use, the Pod's information is stored in an application's list array variable for use in the next step. Details of the stored information are described below:

| Field | Type | Mean |
| --- | --- | --- |
| Metadata | Object | Pod metadata fields information such as name, namespace, labels, and annotation field (containing network information such as network interfaces and associated IPs of the Pod). |
| Hostname | String | The name of the physical host on which the Pod is created, this field helps to accurately reference the Pod. |
| Service | String | The name "service" that the user wants to use to manage a specific IP of the Pod. |
| Interface | String | The IP of this network interface in the Pod will be updated to the management objects of the "service". |

Figure 4:
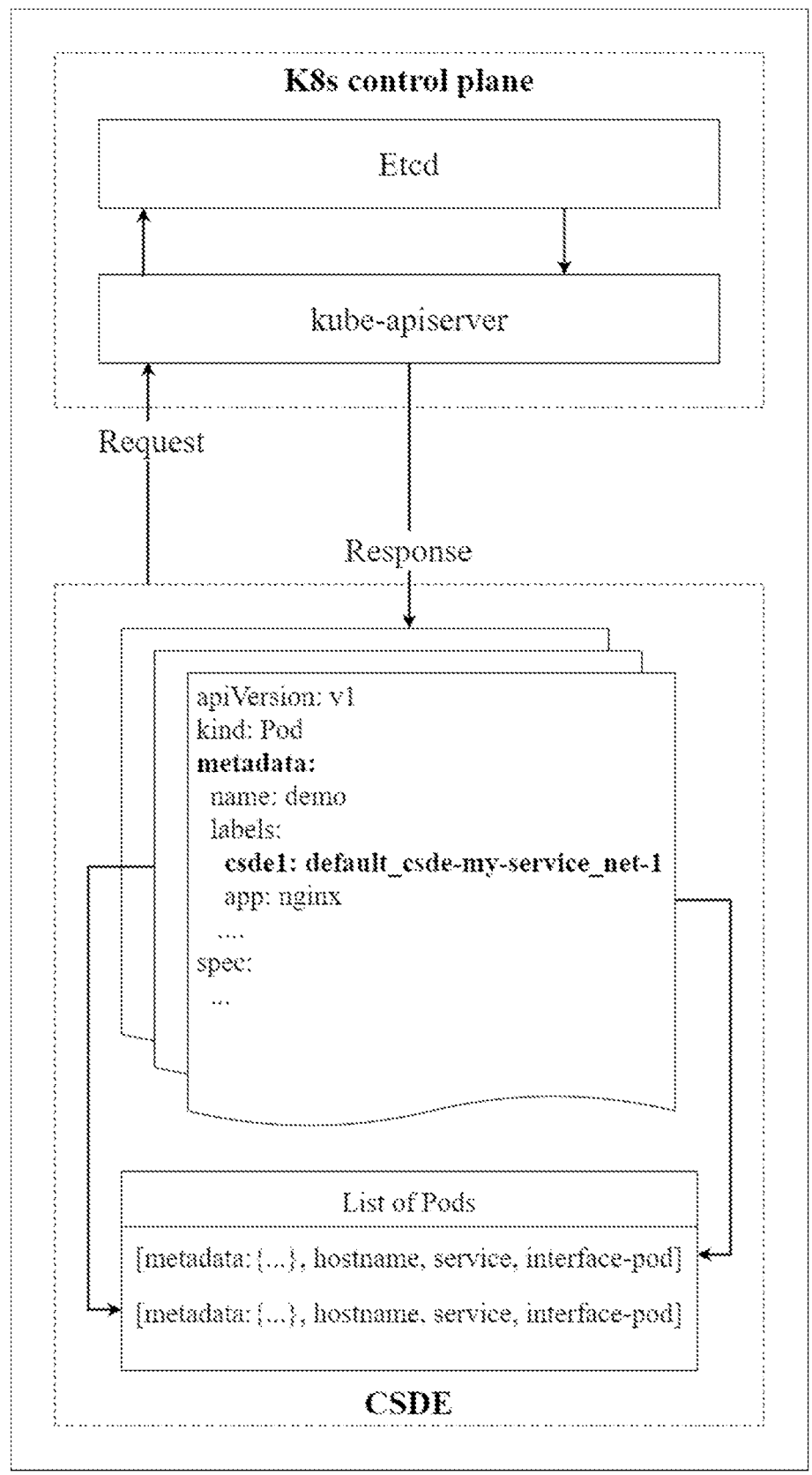
FIG. 4: is a drawing depicting the process of handling Pod objects.

FIG. 4 depicts the data structure of a variable stored in this step.

Step 3: register the IP of the Pod to the corresponding CSDE "service" according to the requirement to use a specific network range.

The task of this step is to pass the results obtained from step 2 to update the network list of the Pod to the corresponding CSDE "service". Specifically, in step 1, we have a list variable containing information about CSDE "services" and a list variable containing information about Pods obtained after step 2.

At this step, make the following comparison in turn:

The namespace information of the "service" and the Pod must be the same. Compare the two string literals of each variable's namespace.

There exists a "service" that is specified in the "service" name element placed in the label assigned to the Pods. Compare the two strings of the name "service" and the name "service" in the labels of the Pod to see if they match.

If the above two conditions are satisfied, we can proceed to update the IP information of the Pod into the "service", based on the network interface information indicated in the Pod's label, we can get the IP correctly assigned on the Pod's network interface and update it to the IP list that the "service" manages.

Figure 5:
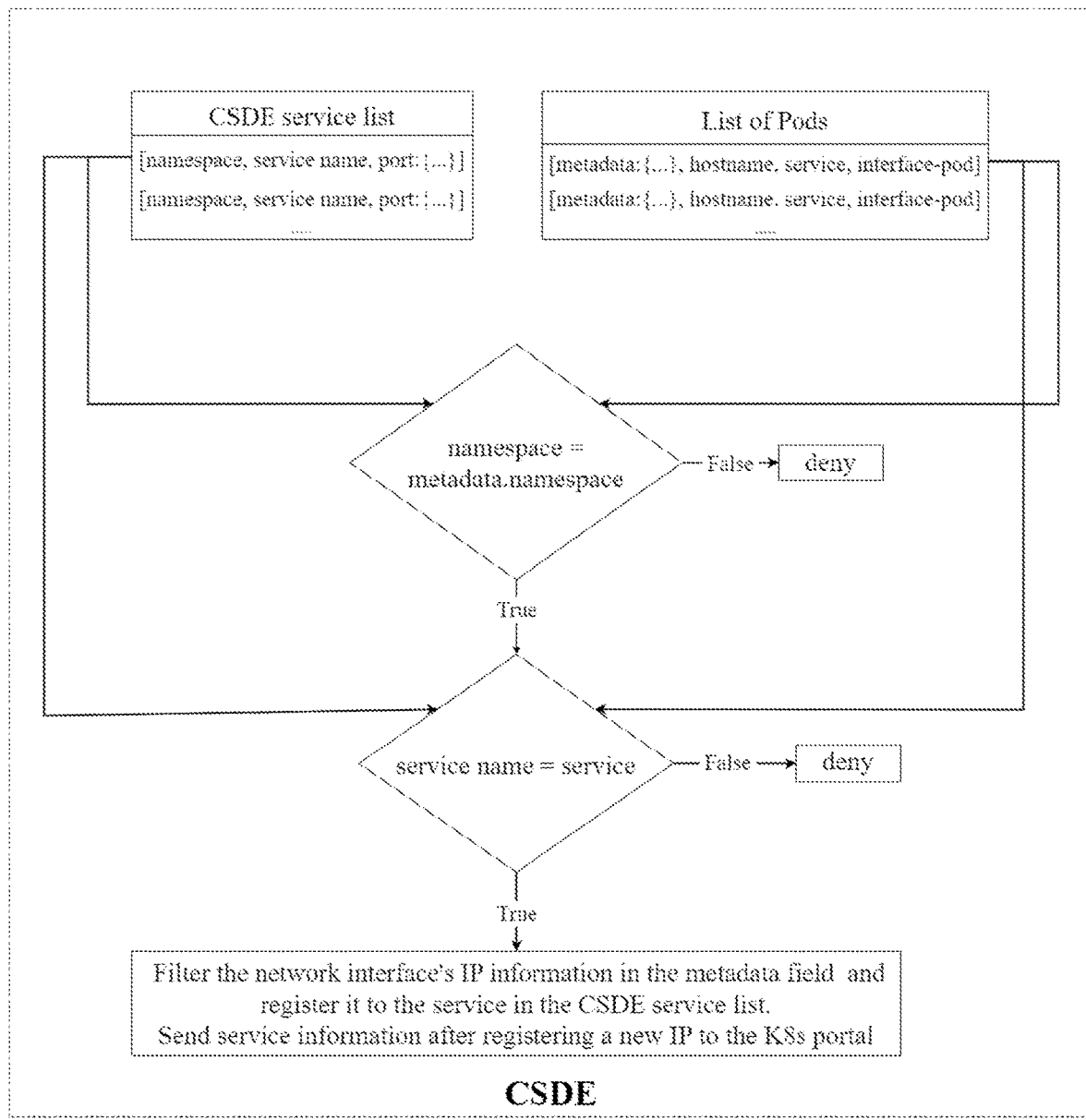
FIG. 5: is a drawing depicting the comparison process to find the group of containers belonging to the corresponding "service".

FIG. 5 depicts the process of checking the above two conditions.

At the end of this step, the IP address is updated to the management list of the K8s "service" according to the specific use of the application.

The above steps are repeated every 5 seconds to ensure that the change in the number of IPs registered with the "service" is updated.

Effect of Invention

Solves the problem of using multiple network bands for a Pod in a container virtualization environment, which opens up many options for using high-speed networks as well as using the network for specialized connectivity purposes.

Take advantage of the amortization cost of network cards on the physical server.

What is claimed is:

1. A customizable service endpoints search method, (Custom Service Discovery Endpoint (CDSE)), comprising the following steps:
    discovering CSDE custom services customized by a CSDE method, where a CSDE application collects information about custom services that exist in an environment that are stored in a K8s database by sending HTTP protocol queries to a K8s gateway component;
    obtaining all custom services information on all existing namespaces in an environment;
    identifying the CSDE custom services by prefixing a "csde-" prefix to a service name, then injecting the CSDE custom services and their namespaces into a data structure to track changes to an enclosing Pod, the data structure consisting of the following elements:
        a Namespace element comprising a string with a name of the namespace in which the CDSE custom service is created;
        a service element comprising a string with a name of a CDSE custom service using a CDSE method; and
        a Port element, comprising an object that contains a list of ports, which may comprise an application port, a service port, or a server port declared for use in the CDSE custom service;
    discovering groups of running Pods belonging to respective CSDE custom services, to find all running Pods that are associated with the respective CDSE custom services in use;
    examining labels contained in the Pods to find information; wherein the labels are a pre-conventional key value pair that helps detect pods using a particular CSDE custom service, this value pair is stored as a JSON data structure in a K8s cluster's own database;
    labeling on groups with labels indicating which CSDE custom service a group wants to use, the labels having a form of csde*:<namespace>_<service>_<interface-pod>; wherein the namespace portion of the label comprises the namespace that the CDSE custom service creates in it, the <service> portion of the label comprises the name of the CDSE custom service that uses the CDSE method, and the <interface-pod> portion of the label comprises a network interface name of the Pods that wants to update the IP addresses to a CDSE custom service's management list;
    once it is known what CSDE custom services the Pods wants to use, the group's information is stored in an application's list array variable, the list array comprising the following fields:
    a Metadata object comprising Pod metadata fields information selected from name, namespace, labels,
    an annotation field containing network information such as network interfaces and associated IPs of the Pods,
    a Hostname, comprising a string of a name of a physical host on which the Pods are created to help to accurately reference the Pods,
    a Service, comprising a string that is a name of a CDSE custom service that a user wants to use to manage a specific IP of the Pods, and
    an Interface comprising a string having an IP of a network interface in the Pods that will be updated to management objects of the service;
    registering the IP of the Pods with the corresponding CSDE custom service as required using a specific network scope to update a network list of the Pods for the corresponding CDSE custom service;
    performing the following comparison in turn:
        comparing two string literals of each variable's namespace to ensure the namespace information of the service and the Pods are the same;
        placing the service that is indicated in the CDSE custom service name element in a label assigned to the Pods; perform a comparison of the character strings of the name CDSE custom service and the name service in the label of the Pods to determine if there is a match;
        if the above two conditions are met, updating IP information of a container group into the CDSE custom service, based on the network interface information indicated in the group's label;
    updating the IP address to the management list of the K8s service according to a specific use of the application;
    repeating the discovering CDSE custom services, discovering groups of running pods and registering the IP of the Pods, every 5 seconds to ensure that a policy of changes in the number of IPs registered with the CDSE custom service is updated.

* * * * *